April 18, 1961   L. A. MEDLAR   2,980,842
BATTERY CHARGING APPARATUS
Filed June 10, 1957   2 Sheets-Sheet 1

INVENTOR
LEWIS A. MEDLAR
BY DCRoylance
ATTORNEY

DIRECTION OF AIR FLOW FROM COOLING FAN

INVENTOR
LEWIS A. MEDLAR
ATTORNEY

United States Patent Office 2,980,842
Patented Apr. 18, 1961

2,980,842

BATTERY CHARGING APPARATUS

Lewis A. Medlar, Oreland, Pa., assignor to Fox Products Company, Philadelphia, Pa., a corporation of Pennsylvania Filed June 10, 1957, Ser. No. 664,783

3 Claims. (Cl. 321—27)

This invention relates to battery chargers and more particularly to an improved transformer-rectifier type apparatus for selectively charging storage batteries of two different voltage ratings.

With the advent of 12-volt automotive storage batteries, it has become necessary to provide automotive service stations and the like with a battery charger which will selectively charge either a standard 6-volt battery or a 12-volt battery, the apparatus being conditioned accordingly by a switching operation carried out by the operator. Three ways of designing a 6–12 volt battery charging circuit have been proposed. The first of these simply employs two separate, independently used charging circuits connected in parallel to the output cables, one for 6-volt batteries and the other for 12-volt batteries. The second prior-art proposal involves the use of a single transformer-rectifier circuit with sufficient taps on the primary of the transformer to give the desired output voltage range. The third prior-art circuit is that shown in my prior Patent 2,777,107, issued January 8, 1957.

The economic disadvantages of the first circuit mentioned are obvious, since a complete duplication of the circuit components is undesirable. While the second prior-art circuit mentioned has the advantage of avoiding such duplication, it has the disadvantage that the rectifier must have a voltage rating high enough for 12-volt charging and a current rating high enough for 6-volt charging, with the result that, assuming the rectifier to be of the usual dry plate type, the rectifier plate area must be at least two or three times as great as is required for 6-volt charging. Further, if the transformer is designed to provide the desired voltage range for 6–12 volt charging as a result of adjustment of the tap switch, then the flux density of the transformer core is lower than desirable for good economy, when charging at lower voltage levels, and the transformer is unduly large. While the circuit of my Patent 2,777,107 is advantageous because it allows use of a transformer of minimum size, it has the disadvantage of only approaching optimum rectifier economy since the rectifier must be about one and one half times as large as the theoretical minimum.

The present invention provides a 6–12 volt charging circuit wherein optimum use of both the transformer and the rectifier is achieved. Broadly, this is accomplished by using two separate rectifiers, each at the 6 volt rating but at a current rating equal to one half that which would normally be required for 6-volt charging, the rectifiers being combined in specially designed circuit means such that they can be connected either in parallel, to supply current at the lower voltage, or in series, to supply current at the higher votlage.

An object of the invention is to devise a dual level battery charging apparatus in the manner just stated and wherein the charging circuit will deliver the proper charging current for each condition of operation.

Another object is to provide such a dual level charging apparatus employing resistance means selectively connected in the charging circuit to assure attainment of the proper current ratings at both charging levels.

A further object is to provide such a charging apparatus including a rectifier and resistance unit which is both unusually inexpensive and specially adapted for efficient joint cooling of the resistance and rectifier.

In order that the manner in which these and other objects are attained in accordance with the invention can be understood in detail, reference is had to the accompanying drawings, which form a part of this specification, and wherein.

Figure 1:
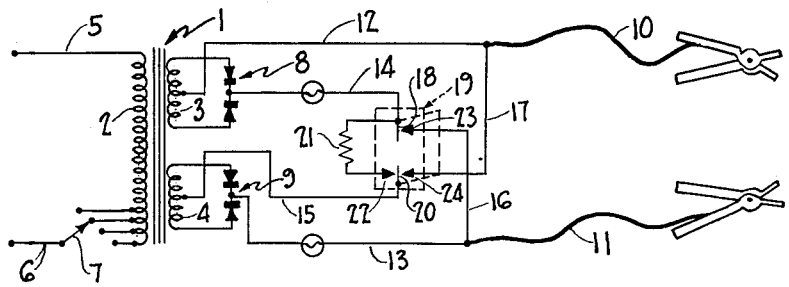
Fig. 1 is a schematic circuit diagram of a dual level battery charger constructed in accordance with one embodiment of the invention.

Referring now to the drawings in detail, and first to Fig. 1 thereof, it will be seen that the embodiment of the invention here illustrated comprises a transformer 1 having a primary winding 2 and two centertapped secondary windings 3 and 4. To supply alternating current to the apparatus, a supply circuit is provided comprising conductors 5 and 6 and a conventional tap switch 7.

Connected respectively across secondary windings 3 and 4 are centertapped rectifier units 8 and 9. As will be later explained, the units 8 and 9 are advantageously part of a single, conventional, dry plate rectifier assembly, the units being established merely by the electrical connections to the rectifier.

Two charging or power cables 10 and 11 are provided, each terminating in a conventional connector clamp for connection to a terminal of the battery to be charged. Cable 10 is connected to the centertap of secondary winding 3 by conductor 12. Cable 11 is connected to the centertap of rectifier unit 9 by conductor 13.

In addition, the charging or output circuit comprises a first pair of conductors 14 and 15 and a second pair of conductors 16 and 17. Conductor 14 has one end connected to the centertap of rectifier unit 8 and the other to movable contact 18 of two-position switching means 19. Conducor 15 is connected between the centertap of secondary winding 4 and a second movable contact 20 of switching means 19. A resistance 21 is connected between movable contact 18 and a fixed contact 22 disposed for engagement by movable contact 20 of switching means 19.

Figure 2:
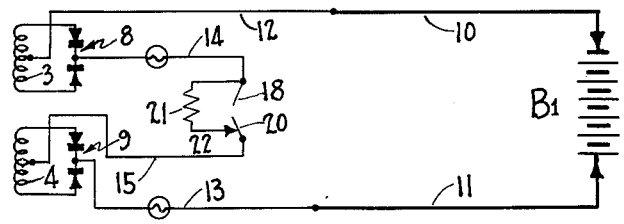
Fig. 2 is a diagram of a portion of the circuit of Fig. 1 connected to charge at a higher voltage level.

Thus, when switching means 19 is actuated to a first operative position, as illustrated in Fig. 2, the rectifier units 8 and 9 are connected in series, with resistance 21 connected in series between the two rectifier units, so that the rectifier units supply current at a relatively higher voltage level to battery $B_1$ via cables 10 and 11. It will be noted that such connection is obtained without switching the cables 10 and 11, and that conductors 16 and 17 are omitted from the circuit.

Conductor 16 is connected between power cable 11 and a stationary contact 23 of switching means 19, contact 23 being disposed for engagement by movable contact 18. Conductor 17 is connected between power cable 10 and a fixed contact 24 of switching means 19, contact 24 being disposed for engagement by movable contact 20.

Figure 3:
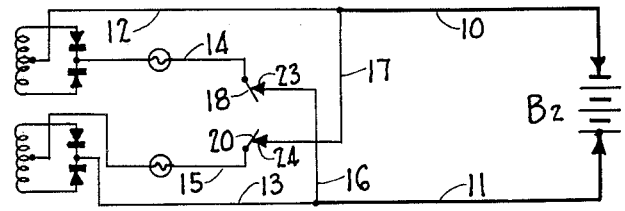
Fig. 3 is a similar diagram of a portion of the circuit of Fig. 1 connected to charge at a lower voltage level.

Thus, when switching means 19 is actuated to its other operative position, as illustrated in Fig. 3, the rectifier units are connected in parallel, with resistance 21 omitted from the circuit and conductors 16 and 17 included, to supply current to the battery B₂ at a relatively lower voltage level. Again, it will be noted that parallel connecion of the rectifier units is obtained without switching the power cables.

Operation of the circuit of Fig. 1 can best be understood by considering the situation which would exist if the rectifiers 8 and 9 were connected independently to completely separate charging circuits designed to operate at the 6-volt charging level with ½ the 6-volt current rate, each such independent charging circuit being complete with charging cables and connected to charge a 6-volt battery of ½ the capacity (that is, 50 ampere-hours) of the conventional 6-volt battery. If such independent circuits were to be connected in parallel, there would be no change in operating conditions and they could charge a conventional 100 ampere-hour 6-volt battery. It is therefore clear that the charging cables could be consolidated, cutting in half the resistance of the charging cables. The separate conductors corresponding to conductors 12–15, Fig. 1, could correspondingly be consolidated and their total resistance halved. Also, with parallel connection, the effective resistance of the rectifiers and transformers, looking at the parallel circuit as a whole, is ½ of the corresponding resistance of each of the two completely independent circuits here being theoretically considered.

Now, if the completely independent circuits being theoretically considered should be connected in series, that is, the rectifier, charging cables and 50 ampere-hour batteries all connected in series so that the two 50 ampere-hour batteries would be equivalent to a 50 ampere-hour battery of twice the voltage, it is clear that charging would still proceed as desired, the battery voltage being doubled and the supply voltage being doubled. Now, however, the resistance of the theoretically considered circuit is twice that of each of the completely separate circuits first considered and the overall resistance of the series-connected circuit would therefore be four times that of the parallel-connected circuit.

Referring now to Figs. 1–3 again, it will be noted that the charging cables 10 and 11 are not switched in the change between series and parallel operation. Thus, it it clear that the 4:1 ratio of resistance above mentioned does not pertain when considering the circuit of Fig. 1 in its series operation, on the one hand, and parallel operation, on the other hand. Further, the conventional 12-volt and 6-volt batteries to be charged by the apparatus of Fig. 1 do not have capacity ratings of 2:1, so that the voltage required at the terminals to charge the 12-volt batteries is not precisely double that required for the 6-volt batteries (as it would be if both the capacities and the current had 2:1 ratios). It is therefore obvious that, if a circuit were designed to provide satisfactory operation at the lower voltage level, the desired current rating would not be supplied at the higher voltage level. In most cases, considering conventional 6-volt and 12-volt batteries, design of the circuit for proper 6-volt charging gives too high a current during 12-volt charging. In such cases, I am able to compensate for this misalignment by providing the resistance 21 in the manner described, so that the resistance is in the circuit only when the circuit is connected for series charging of batteries of the higher voltage rating, as seen in Fig. 2.

It is to be noted that, since cables 10 and 11 are always in circuit, whether charging is at the higher or lower voltage level, the cable must be of sufficient size to carry the maximum current which will be encountered, and are therefore oversize as to the lower charging level. Conductors 16 and 17, on the other hand, carry only one half of the maximum current and therefore need have only one half of the cross-sectional area of the cables 10 and 11. In actual practice, it is frequently advantageous to connect cables 10 and 11 directly to the center tap of secondary winding 3 and the center tap of rectifier unit 9, respectively, conductors 17 and 16 being connected respectively to the same points, and conductors 12 and 13 being eliminated.

Figure 5:
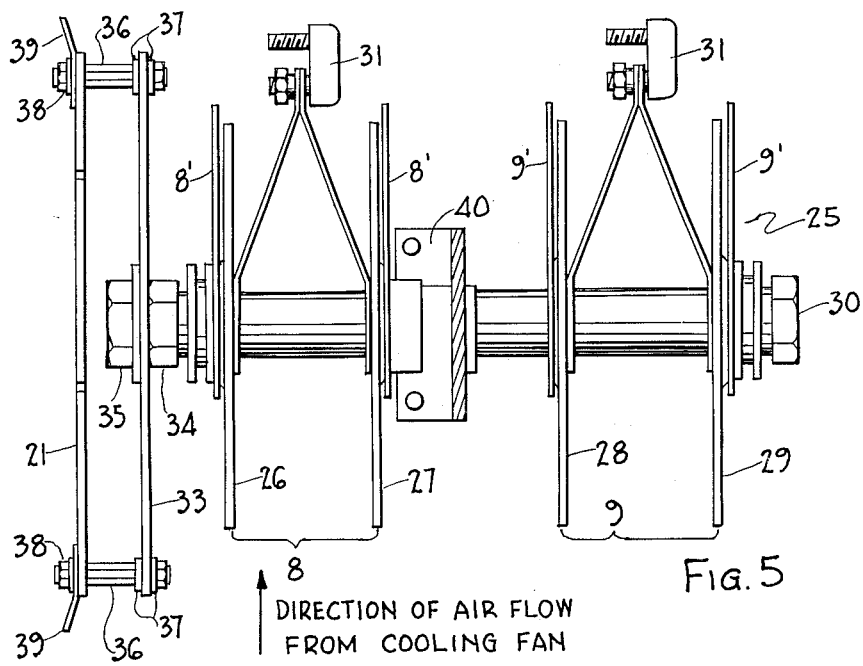
Fig. 5 is an elevational view of a resistance and rectifier unit employed in the apparatus of Fig. 1.

Referring now to Fig. 5, it will be seen that the center tapped rectifier units 8 and 9 are provided by a single, conventional, dry plate rectifier assembly 25 comprising four rectifier plates 26–29 carried in the usual manner by a single centrally disposed stud 30. The manner of connection of rectifier units 8 and 9 will be clear when it is noted that connectors 8' and 9' are connected to the terminals of secondary windings 3 and 4, respectively, and devices 31 are the circuit breakers illustrated diagrammatically in Fig. 1.

Figure 6:
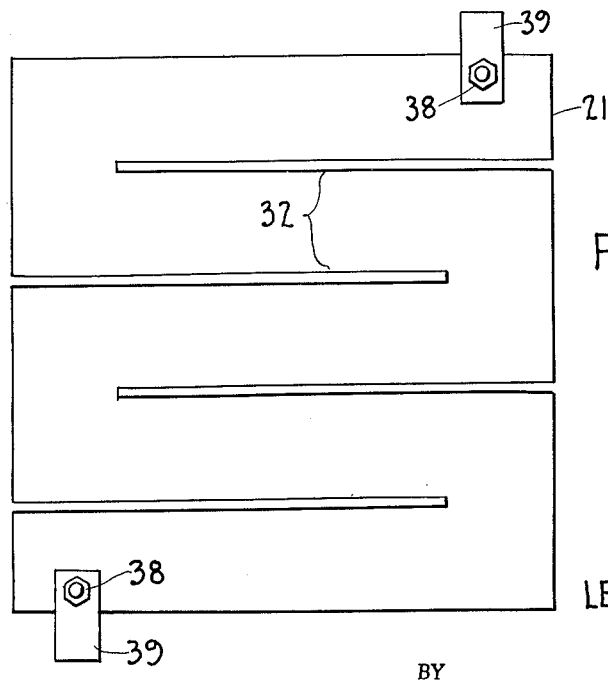
Fig. 6 is a side elevational view of the resistance element of the device of Fig. 5.

As seen in Fig. 6, the resistance 21 is in the form of a metal sheet, advantageously of stainless steel, provided with parallel slots 32 defining in the sheet a resistance path of serpentine configuration. The left end of stud 30, as viewed in Fig. 5, is threaded and mounts a centrally apertured metal plate 33 secured in place by nuts 34 and 35, the plate 33 being of the same general configuration as the resistance 21. At opposite corners, the plate 33 is provided with outwardly extended mounting studs 36 insulated from the plate by shoulder washers 37 of insulating material. The studs extend through holes in the resistance 21 and the resistance is secured to the studs, as by nuts 38, which also position connecting lugs 39 by which the resistance is connected into the circuit as shown in Fig. 1.

The charging apparatus is provided with a cooling fan (not shown), the fan being driven by an electric motor connected across supply leads 5 and 6 in the usual manner. The assembly shown in Fig. 5 is mounted, as by mounting bracket 40, in such a position relative to the fan that the planes of rectifier plates 26–29 and the planes of elements 21 and 33 are disposed parallel to the flow of cooling air provided by the fan. Thus, it will be seen that the rectifier and the resistance are combined into a single unit cooled by the same fan. Further, it will be noted that the plate 33 is of the same general size and shape as the resistance element 21 and therefore acts as a barrier to heat transfer from the resistance 21 to the rectifier assembly, some of the heat from the resistance being imparted to the plate 33 so that air flow across the plate 33 accomplishes a more successful cooling action.

The circuit arrangement of Fig. 1 is devised for that situation, usually met with in the case of charging conventional 6-volt and 12-volt batteries, where the charging current at the high voltage level would be too high without resistance 21. In other situations, the reverse relationship may occur. In other words, if the circuit is properly designed for charging at the lower voltage level, the current will then be too low at the high voltage level. In that event, the invention takes the form shown in Fig. 4, the additional resistance being placed in conductors 116 and 117 which are in circuit only when the switching means 119 is actuated to select the parallel circuit condition. It is now necessary that the resistance 21 of Fig. 1 be replaced by the two equal resistances 121 and 121', Fig. 4, connected respectively in conductors 116 and 117. Movable contact 118 of the switch 119 is now of course connected directly to stationary contact 122.

Figure 4:
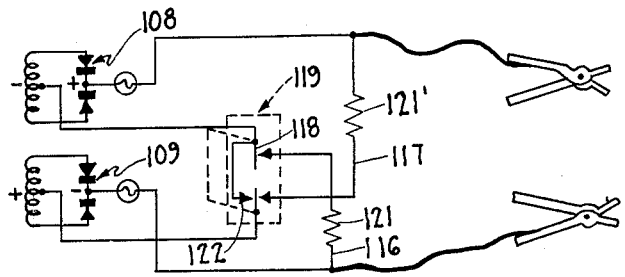
Fig. 4 is a circuit diagram illustrating a modified form of the apparatus of Fig. 1.

In this embodiment, the circuit is designed for proper operation at the higher voltage level with the circuit series connected and with no additional resistance being introduced, and the size of resistance 121 and 121' selected to give the desired output at the lower voltage level with the circuit parallel-connected. It will be noted that the embodiment of Fig. 4 has been illustrated with the rectifier units 108 and 109 of opposite polarity and it will be understood that the rectifier connections shown in Figs. 1 and 4 are interchangeable.

It will be understood that the centertapped rectifier units 8 and 9 constitute separate D.C. current sources of equal voltage and internal impedance. It will also be understood that, while the rectifier units have been shown as of the center-tapped type, they may, in some applications, advantageously be of the bridge type.

I claim:

1. In an apparatus for selectively charging storage batteries of two different voltage ratings, the combination of a transformer having a primary winding and first and second centertapped secondary windings, supply circuit means for connecting said primary winding to a source of alternating current, first and second centertapped dry plate rectifier units respectivly connected across said first and second secondary windings, two power cables each terminating at one end in means for connection to a terminal of the battery to be charged, one of said cables being connected to the center tap of said first secondary winding and the other of said cables being connected to the center tap of said second rectifier unit, a first pair of conductors connected one to the center tap of said first rectifier unit and one to the center tap of said second secondary winding, a resistance, a second pair of conductors connected each to the other end of a different one of said power cables, and switching means having two operative positions, said switching means being arranged to interconnect said first pair of conductors and said resistance in series when said switching means is in one operative position, thereby connecting said rectifier units in series to supply current at a relatively higher voltage level via said power cables, and to interconnect said second and first pairs of conductors and omit said resistance when said switching means is in the other operative position, thereby connecting said rectifier units in parallel to supply current at a relatively lower voltage level via said power cables and said second pair of conductors.

2. In an apparatus for selectively charging storage batteries of two different voltage ratings, the combination of a transformer having a primary winding and two secondary windings, supply circuit means for connecting said primary winding to a source of alternating current, a pair of dry plate rectifier units each having input and output terminals, the input terminals of each of said rectifier units being connected to a different one of said secondary windings, a pair of power cables each terminating at one end in means for connection to a terminal of the battery to be charged, circuit means including a two-position switch arranged to connect said rectifier units to supply current to the battery via said power cables either in parallel or in series, depending upon the position of said switch, said circuit means including two conductors each connected between said switch and the other end of a different one of said power cables, said conductors being connected in circuit only when said switch is actuated to select parallel connection of said rectifier units, and two equal supplementary resistances connected each in a different one of said conductors, said circuit means also including two additional conductors connecting the output terminals of said rectifiers each to a different one of said power cables.

3. In a battery charger adapted for charging storage batteries of two different voltage ratings and having a cooling fan and an A.C. supply circuit including a transformer, the combination of two centertapped secondary windings provided by the transformer, a dry plate rectifier assembly comprising a series of rectifier plates carried by a mounting stud, rectifier circuit means connecting two equal groups of said plates each across a different one of said secondary windings to form two centertapped rectifier units, a pair of power cables each terminating at one end in means for connection to a terminal of the battery to be charged, two conductors each connected to the other end of a different one of said power cables, a resistance in the form of a metal plate, means including a two-position switching device for connecting said rectifier units in parallel to supply current at a relatively lower voltage level via said power cables and two conductors, with said resistance omitted, when said switching device is in one position, and in series to supply current at a higher voltage level via said power cables, with said two conductors omitted and said resistance included in series with the series connected rectifier units, when said switching device is in its other position, and means mounting said resistance on one end portion of the stud of said rectifier assembly generally parallel to said rectifier plates, said rectifier assembly and resistance being disposed in the path of cooling air from the fan of the battery charger.

References Cited in the file of this patent

UNITED STATES PATENTS

| | | |
|---|---|---|
| 1,845,573 | Ackerly | Feb. 16, 1932 |
| 2,179,137 | Stevens et al. | Nov. 7, 1939 |
| 2,247,506 | Kutcher et al. | July 1, 1941 |
| 2,340,098 | Zuhlke | Jan. 25, 1944 |
| 2,479,087 | Steward | Aug. 16, 1949 |
| 2,502,729 | Klinkhamer | Apr. 4, 1950 |
| 2,720,616 | Vanderhoof | Oct. 11, 1955 |
| 2,777,107 | Medlar | Jan. 8, 1957 |